US012614725B2

(12) United States Patent
Kim et al.

(10) Patent No.: US 12,614,725 B2
(45) Date of Patent: Apr. 28, 2026

(54) POSITIVE ELECTRODE FOR LITHIUM SECONDARY BATTERY AND POSITIVE ELECTRODE AND LITHIUM SECONDARY BATTERY COMPRISING THE SAME

(71) Applicant: LG Energy Solution, Ltd., Seoul (KR)

(72) Inventors: Ji-Hye Kim, Daejeon (KR);
Sang-Seung Oh, Daejeon (KR);
Hyun-Seok Lee, Daejeon (KR);
Sung-Hwan Cho, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 473 days.

(21) Appl. No.: 18/028,897

(22) PCT Filed: Jun. 9, 2022

(86) PCT No.: PCT/KR2022/008169
§ 371 (c)(1),
(2) Date: Mar. 28, 2023

(87) PCT Pub. No.: WO2022/270799
PCT Pub. Date: Dec. 29, 2022

(65) Prior Publication Data
US 2024/0030428 A1    Jan. 25, 2024

(30) Foreign Application Priority Data

Jun. 24, 2021    (KR) ........................ 10-2021-0082673

(51) Int. Cl.
H01M 4/525 (2010.01)
H01M 4/02 (2006.01)
(Continued)

(52) U.S. Cl.
CPC ........... H01M 4/525 (2013.01); H01M 4/131 (2013.01); H01M 4/505 (2013.01); H01M 4/625 (2013.01);
(Continued)

(58) Field of Classification Search
None
See application file for complete search history.

(56) References Cited

U.S. PATENT DOCUMENTS

2014/0370337 A1    12/2014    Matsui et al.
2015/0010819 A1    1/2015    Lee et al.
(Continued)

FOREIGN PATENT DOCUMENTS

CN    101207190 A    6/2008
CN    111213264 A    5/2020
(Continued)

OTHER PUBLICATIONS

Extended European Search Report including Written Opinion for Application No. 22828646.4 dated Feb. 23, 2024, pp. 1-10.
(Continued)

*Primary Examiner* — Colin W. Slifka
(74) *Attorney, Agent, or Firm* — Lerner David LLP

(57) ABSTRACT

A positive electrode for a lithium secondary battery comprising a multilayer structure of electrode active materials. The first positive electrode active material layer comprising a positive electrode active material particles and a conductive material on at least one surface of the current collector. The second positive electrode active material layer positioned on the first positive electrode active material layer and comprising positive electrode active material particles and a conductive material.

15 Claims, 2 Drawing Sheets

(51) Int. Cl.
| | |
|---|---|
| *H01M 4/131* | (2010.01) |
| *H01M 4/505* | (2010.01) |
| *H01M 4/62* | (2006.01) |

(52) U.S. Cl.
CPC ................. *H01M 2004/021* (2013.01); *H01M 2004/028* (2013.01)

(56) References Cited

U.S. PATENT DOCUMENTS

| | | |
|---|---|---|
| 2016/0013480 A1 | 1/2016 | Sikha et al. |
| 2018/0219212 A1 | 8/2018 | Seol et al. |
| 2019/0013545 A1 | 1/2019 | Kim et al. |
| 2019/0157681 A1 | 5/2019 | Ho et al. |
| 2019/0312259 A1 | 10/2019 | Baek et al. |
| 2020/0083524 A1 | 3/2020 | Baek et al. |
| 2020/0127276 A1 | 4/2020 | Kim et al. |
| 2020/0388830 A1 | 12/2020 | Lee et al. |
| 2021/0167365 A1 | 6/2021 | Kim et al. |
| 2021/0167366 A1 | 6/2021 | Leng et al. |
| 2021/0175511 A1 | 6/2021 | Li et al. |
| 2022/0123286 A1 | 4/2022 | Li et al. |
| 2022/0140320 A1 | 5/2022 | Jin et al. |
| 2022/0216480 A1 | 7/2022 | Kim et al. |

FOREIGN PATENT DOCUMENTS

| | | |
|---|---|---|
| CN | 111446488 A | 7/2020 |
| CN | 111492510 A | 8/2020 |
| CN | 111816839 A | 10/2020 |
| CN | 111989805 A | 11/2020 |
| CN | 112216822 A | 1/2021 |
| EP | 2675002 A1 | 12/2013 |
| EP | 3457468 A1 | 3/2019 |
| EP | 3764438 A1 | 1/2021 |
| JP | 2015002065 A | 1/2015 |
| JP | 2015082480 A | 4/2015 |
| JP | 6167854 B2 | 7/2017 |
| JP | 2017157529 A | 9/2017 |
| KR | 20120131308 A | 12/2012 |
| KR | 20150006283 A | 1/2015 |
| KR | 20170069153 A | 6/2017 |
| KR | 20170103184 A | 9/2017 |
| KR | 20180058197 A | 5/2018 |
| KR | 20190001566 A | 1/2019 |
| KR | 20200043612 A | 4/2020 |
| KR | 20210040804 A | 4/2021 |
| KR | 20210063029 A | 6/2021 |
| WO | 2018068662 A1 | 4/2018 |
| WO | 2021029652 A1 | 2/2021 |
| WO | 2021109080 A1 | 6/2021 |

OTHER PUBLICATIONS

International Search Report for PCT/KR2022/008169 mailed Sep. 13, 2022. 3 pgs.
Search Report dated Nov. 20, 2025 from the Office Action for Chinese Application No. 202280005826.X issued Nov. 21, 2025, 3 pages.

0.5C/1.0C 45°C Cycle(2.5-4.2V)

POSITIVE ELECTRODE FOR LITHIUM SECONDARY BATTERY AND POSITIVE ELECTRODE AND LITHIUM SECONDARY BATTERY COMPRISING THE SAME

CROSS-REFERENCE TO RELATED APPLICATIONS

The present application is a national phase entry under 35 U.S.C. § 371 of International Application No. PCT/KR2022/008169 filed on Jun. 9, 2022 which claims priority from Korean Patent Application No. 10-2021-0082673 filed on Jun. 24, 2021, all of which are is incorporated herein by reference.

TECHNICAL FIELD

The present disclosure relates to a positive electrode having a positive electrode active material layer with a multilayer structure comprising a nickel-based lithium transition metal oxide and a lithium secondary battery comprising the same.

BACKGROUND ART

Recently, with the rapid widespread use of electronic devices using batteries, for example, mobile phones, laptop computers and electric vehicles, there is a fast growing demand for secondary batteries with small size, light weight and relatively high capacity. In particular, lithium secondary batteries are gaining attention as a power source for driving mobile devices due to their light weight and high energy density advantages. Accordingly, there are many research and development efforts to improve the performance of lithium secondary batteries.

A lithium secondary battery includes an organic electrolyte solution or a polymer electrolyte solution filled between a positive electrode and a negative electrode made of an active material capable of intercalating and deintercalating lithium ions, and electrical energy is produced by oxidation and reduction reactions during the intercalation/deintercalation of lithium ions at the positive electrode and the negative electrode.

The positive electrode active material of the lithium secondary battery includes lithium cobalt oxide ($LiCoO_2$), nickel-based lithium transition metal oxide, lithium manganese oxide ($LiMnO_2$ or $LiMn_2O_4$) and a lithium iron phosphate compound ($LiFePO_4$). Among them, lithium cobalt oxide ($LiCoO_2$) is widely used due to its high operating voltage and large capacity advantages, and has high-voltage positive electrode active material applications. However, cobalt (Co) has a limitation on the use in a large amount as a power source in the field of electric vehicles due to its price rise and unstable supply, and thus the need arises for the development of alternative positive electrode active materials, and in particular, Ni-rich lithium composite transition metal oxide positive electrode active materials attract attention due to their high capacity.

The nickel-rich lithium composite transition metal oxide positive electrode active materials currently available in the market include secondary particles formed by agglomeration of primary microparticles having the average particle size D50 on a few hundreds of nm level, and to increase the output and the compaction density, bimodal-type positive electrode active materials including a mixture of two types of secondary particles having different average particle sizes D50, i.e., secondary macroparticles having a larger average particle size and secondary microparticles having a smaller average particle size are commonly used.

The secondary particles formed by agglomeration of primary microparticles have a large specific surface area and a low particle strength. Accordingly, in the rolling process of electrodes comprising the bimodal-type positive electrode active materials using a roll press, cracking occurs especially in secondary macroparticles so much, causing the production of gas in large amounts during cell operation and stability reduction. Accordingly, it is difficult to increase the pressure of the roll press sufficiently to prevent a short circuit, or the life characteristics may degrade. In particular, in the case of high-Ni lithium transition metal oxide having high nickel content to ensure high capacity, when particle cracking occurs due to its structural problem, the chemical stability gets worse and it is difficult to ensure the thermal stability.

DISCLOSURE

Technical Problem

An aspect of the present disclosure is directed to providing a positive electrode for a lithium secondary battery comprising a positive electrode active material layer comprising positive electrode active material secondary macroparticles and secondary microparticles having different average particle sizes to allow sufficiently high rolling pressure when manufacturing the electrode.

Another aspect of the present disclosure is directed to providing a positive electrode for a lithium secondary battery comprising a positive electrode active material layer comprising positive electrode active material secondary macroparticles and secondary microparticles having different average particle sizes to improve the life characteristics.

Still another aspect of the present disclosure is directed to providing a lithium secondary battery comprising the positive electrode for a lithium secondary battery having the above-described features.

Technical Solution

An aspect of the present disclosure provides a positive electrode for a lithium secondary battery according to the following embodiment.

A first embodiment relates to the positive electrode for a lithium secondary battery, comprising:

a current collector;

a first positive electrode active material layer on at least one surface of the current collector, the first positive electrode active material layer comprising positive electrode active material particles and a conductive material, the positive electrode active material particles including at least one type of positive electrode active material particles selected from the group consisting of primary macroparticles having an average particle size D50 of 0.5 to 3 μm, secondary particles having an average particle size D50 of 3 to 7 μm formed by agglomeration of the primary macroparticles and a mixture thereof; and a second positive electrode active material layer on the first positive electrode active material layer, the second positive electrode active material layer comprising positive electrode active material particles and a conductive material, the positive electrode active material particles comprising:

positive electrode active material secondary micropar-
ticles having an average particle size D50 of 1 to 7
μm formed by agglomeration of primary macropar-
ticles having an average particle size D50 of 0.5 to
3 μm or by agglomeration of primary microparticles
having a smaller average particle size D50 than the
primary macroparticles, and
positive electrode active material secondary macropar-
ticles having an average particle size D50 of 7 to 20
μm formed by agglomeration of primary micropar-
ticles having a smaller average particle size D50 than
the primary macroparticles, wherein the average
particle size D50 of the secondary macroparticles is
larger than the average particle size D50 of the
secondary microparticles,
wherein the positive electrode active material particles are
a nickel-based lithium transition metal oxide positive
electrode active material, and
wherein the conductive material included in the second
positive electrode active material layer comprises
single-walled carbon nanotubes.

A second embodiment relates to the positive electrode for
a lithium secondary battery according to the first embodi-
ment, wherein the average particle size D50 of the primary
microparticles is 100 to 900 nm, and in particular, 100 to 400
nm.

A third embodiment relates to the positive electrode for a
lithium secondary battery according to the first or second
embodiment, wherein an average crystallite size of the
primary macroparticles included in the first positive elec-
trode active material layer is equal to or larger than 200 nm.

A fourth embodiment relates to the positive electrode for
a lithium secondary battery according to any one of the first
to third embodiments, wherein the average particle size D50
of the primary macroparticles included in each of the first
and second positive electrode active material layers is 1 to
3 μm.

A fifth embodiment relates to the positive electrode for a
lithium secondary battery according to any one of the first to
fourth embodiments, wherein the average particle size D50
of the secondary microparticles is 2 to 5 μm, and the average
particle size D50 of the secondary macroparticles is 8 to 16
μm.

A sixth embodiment relates to the positive electrode for a
lithium secondary battery according to any one of the first to
fifth embodiments, wherein the ratio of the average particle
size D50 of the secondary macroparticles to the average
particle size D50 of the secondary microparticles is 5:1 to
2:1.

A seventh embodiment relates to the positive electrode for
a lithium secondary battery according to any one of the first
to sixth embodiments, wherein the secondary microparticles
are present in an amount of 10 to 100 parts by weight based
on 100 parts by weight of the secondary macroparticles.

An eighth embodiment relates to the positive electrode for
a lithium secondary battery according to any one of the first
to seventh embodiments, wherein a thickness (a), of the
second positive electrode active material layer meets the
following equation relative to a thickness (b) of the first
positive electrode active material layer:

$$3b \leq a. \quad \text{(Equation)}$$

A ninth embodiment relates to the positive electrode for a
lithium secondary battery according to any one of the first to eighth embodiments, wherein the secondary microparticles
are agglomerates of the primary microparticles alone.

A tenth embodiment relates to the positive electrode for a
lithium secondary battery according to any one of the first to
ninth embodiments, wherein the nickel-based lithium tran-
sition metal oxide is represented by $$Li_aNi_{1-x-y}Co_xM^1_yM^2_wO_2,$$

wherein $1.0 \leq a \leq 1.5$, $0 \leq x \leq 0.2$, $0 \leq y \leq 0.2$, $0 \leq w \leq 0.1$, $0 \leq x+y \leq 0.2$, $M^1$ is at least one metal of Mn or Al, and $M^2$ is at least
one metal selected from the group consisting of Ba, Ca, Zr,
Ti, Mg, Ta, Nb and Mo, and in particular, $Li_aNi_{1-x-y}Co_xM-n_yO_2$, wherein $1.0 \leq a \leq 1.5$, $0 \leq x \leq 0.2$, $0 \leq y \leq 0.2$, $0 \leq x+y \leq 0.2$.

An eleventh embodiment relates to the positive electrode
for a lithium secondary battery according to any one of the
first to tenth embodiments, wherein the single-walled carbon
nanotubes are present in an amount of 0.001 weight % or
more based on a total weight of the second positive electrode
active material layer.

A twelfth embodiment relates to the positive electrode for
a lithium secondary battery according to any one of the first
to eleventh embodiments, wherein the conductive material
in the second positive electrode active material layer is
present in an amount of 0.5 to 3 weight % based on a total
weight of the second positive electrode active material layer.

A thirteenth embodiment provides a lithium secondary
battery comprising the positive electrode.

Advantageous Effects

The second positive electrode active material layer of the
positive electrode according to an embodiment of the pres-
ent disclosure comprises both secondary macroparticles and
secondary microparticles and thus has high compaction
density.

Additionally, since the first positive electrode active mate-
rial interposed between the current collector and the second
positive electrode active material layer comprises the posi-
tive electrode active material particles less vulnerable to
cracking, it is possible to prevent a short circuit under
sufficiently high rolling pressure applied when manufactur-
ing the electrode. Accordingly, lithium secondary batteries
comprising the positive electrode including the positive
electrode active material particles is less vulnerable to
cracking have the improved life characteristics.

Moreover, the inclusion of the single-walled carbon nano-
tubes (SW-CNT) for the conductive material of the second
positive electrode active material layer improves the elec-
trode resistance and the cell resistance.

DESCRIPTION OF DRAWINGS

The accompanying drawings illustrate an exemplary
embodiment of the present disclosure, and together with the
above description, serve to help a further understanding of
the technical aspects of the present disclosure, so the present
disclosure should not be construed as being limited to the
drawings. Meanwhile, the shape, size, scale or proportion of
the elements in the accompanying drawings may be exag-
gerated to emphasize a more clear description.

DETAILED DESCRIPTION

Figure 1:
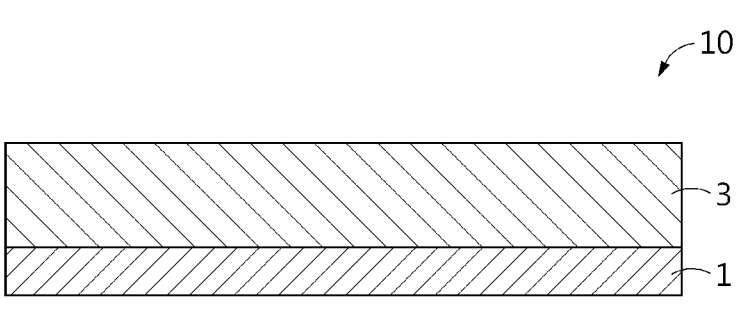
FIG. 1 is a schematic cross-sectional view of a positive
electrode having a positive electrode active material layer
with a single layer structure according to the conventional
art.

Hereinafter, embodiments of the present disclosure will be described in detail. Prior to the description, it should be understood that the terms or words used in the specification and the appended claims should not be construed as limited to general and dictionary meanings, but interpreted based on the meanings and concepts corresponding to technical aspects of the present disclosure, on the basis of the principle that the inventor is allowed to define terms appropriately for the best explanation. Therefore, the disclosure of the embodiments described herein is just an exemplary embodiment of the present disclosure, but not intended to fully describe the technical aspects of the present disclosure, so it should be understood that a variety of other equivalents and modifications could have been made thereto at the time that the application was filed.

Unless the context clearly indicates otherwise, it will be understood that the term "comprises" or "includes" when used in this specification, specifies the presence of stated elements, but does not preclude the presence or addition of one or more other elements.

In the specification and the appended claims, "comprising multiple crystal grains" refers to a crystal structure formed by two or more crystal grains having a specific range of average crystallite sizes. In this instance, the crystallite size of a crystal grain may be quantitatively analyzed using X-ray diffraction analysis (XRD) by Cu Kα X-ray (Xrα). Specifically, the average crystallite size of crystal grains may be quantitatively analyzed by putting the prepared particles into a holder and analyzing diffraction grating for X-ray radiation onto the particles.

In the specification and the appended claims, D50 may be defined as a particle size at 50% of particle size distribution, and may be measured using a laser diffraction method. For example, a method for measuring the average particle size D50 of a positive electrode active material may include dispersing particles of the positive electrode active material in a dispersion medium, introducing into a commercially available laser diffraction particle size measurement device (for example, Microtrac MT 3000), irradiating ultrasound of about 28 kHz with the output power of 60 W, and calculating the average particle size D50 corresponding to 50% of cumulative volume in the measurement device.

In the present disclosure, 'primary particle' refers to a particle of which grain boundaries are seemingly absent when observed with the field of view of 5000 to 20000 magnification using a scanning electron microscope.

In the present disclosure, 'secondary particle' is a particle formed by agglomeration of the primary particles.

In the present disclosure, 'monolith' refers to a particle that exists independently of the secondary particle, and of which grain boundaries are seemingly absent, and for example, it is a particle having the particle diameter of 0.5 μm or more.

In the present disclosure, 'particle' may encompass any one of the monolith, the secondary particle and the primary particle or all of them.

According to an aspect of the present disclosure, there is provided a positive electrode for a lithium secondary battery comprising:

a current collector;

a first positive electrode active material layer on at least one surface of the current collector, the first positive electrode active material layer comprising positive electrode active material particles and a conductive material, the positive electrode active material particles including at least one type of positive electrode active material particles selected from the group consisting of primary macroparticles having the average particle size D50 of 0.5 to 3 μm, secondary particles having the average particle size D50 of 3 to 7 μm formed by agglomeration of the primary macroparticles and a mixture of these particles; and a second positive electrode active material layer on the first positive electrode active material layer, the second positive electrode active material layer comprising positive electrode active material particles and a conductive material, the positive electrode active material particles comprising:

positive electrode active material secondary microparticles having the average particle size D50 of 1 to 7 μm formed by agglomeration of primary macroparticles having the average particle size D50 of 0.5 to 3 μm or by agglomeration of primary microparticles having a smaller average particle size D50 than the primary macroparticles, and positive electrode active material secondary macroparticles having the average particle size D50 of 7 to 20 μm formed by agglomeration of primary microparticles having a smaller average particle size D50 than the primary macroparticles, wherein the average particle size D50 of the secondary macroparticles is larger than the average particle size D50 of the secondary microparticles, wherein the positive electrode active material particles are a nickel-based lithium transition metal oxide positive electrode active material, and the conductive material included in the second positive electrode active material layer comprises single-walled carbon nanotubes (SW-CNT).

Structure of Positive Electrode Active Material Layer

FIG. 1 is a schematic cross-sectional view of a positive electrode having a positive electrode active material layer with a single layer structure according to the conventional art.

Referring to FIG. 1, the conventional positive electrode 10 has a single-layered positive electrode active material layer 3 by applying a bimodal-type positive electrode active material comprising a mixture of secondary macroparticles formed by agglomeration of primary microparticles and secondary microparticles formed by agglomeration of primary microparticles to at least one surface of a current collector 1.

Figure 2:
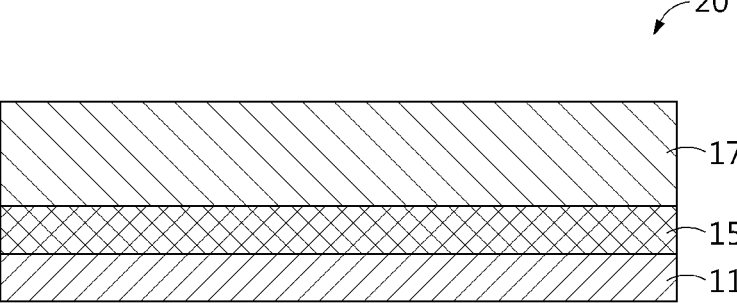
FIG. 2 is a schematic cross-sectional view of a positive electrode having a positive electrode active material layer with a multilayer structure according to the present disclosure.

In contrast, as shown in FIG. 2, a positive electrode 20 of the present disclosure has a positive electrode active material layer with a multilayer structure by forming a first positive electrode active material layer 15 comprising positive electrode active material particles having predetermined characteristics on at least one surface of a current collector 11, and applying a bimodal-type positive electrode active material to the first positive electrode active material layer 15 to form a second positive electrode active material layer 17.

Preferably, the thickness (a) of the second positive electrode active material layer meets the following equation relative to the thickness (b) of the first positive electrode active material layer, considering the output characteristics and the intended effect of the present disclosure.

$$3b \leq a \qquad \text{(Equation)}$$

Current Collector

The current collector, i.e., the positive electrode current collector is not limited to a particular type and may include any type of material having conductive properties without causing any chemical change to the battery, for example, stainless steel, aluminum, nickel, titanium, sintered carbon or aluminum or stainless steel treated with carbon, nickel, titanium or silver on the surface. Additionally, the positive electrode current collector may be generally 3 to 500 μm in thickness, and may have microtexture on the surface to improve the adhesion strength of the positive electrode active material. For example, the positive electrode current collector may come in various forms, for example, films, sheets, foils, nets, porous bodies, foams and non-woven fabrics.

First Positive Electrode Active Material Layer

The positive electrode active material particles included in the first positive electrode active material layer comprises at least one type of positive electrode active material particles selected from the group consisting of primary macroparticles having the average particle size D50 of 0.5 to 3 μm, secondary particles having the average particle size D50 of 3 to 7 μm formed by agglomeration of the primary macroparticles and a mixture of these particles. That is, the positive electrode active material included in the first positive electrode active material layer may include either the primary macroparticles having the average particle size D50 of 0.5 to 3 μm, or the secondary particles having the average particle size D50 of 3 to 7 μm formed by agglomeration of the primary macroparticles, or both. In particular, the positive electrode active material included in the first positive electrode active material layer may include only the secondary particles having the average particle size D50 of 3 to 7 μm formed by agglomeration of the primary macroparticles.

The primary macroparticles are a nickel-based lithium transition metal oxide positive electrode active material, specifically, represented by $$Li_aNi_{1-x-y}Co_xM^1{}_yM^2{}_wO_2$$

$(1.0 \leq a \leq 1.5, 0 \leq x \leq 0.2, 0 \leq y \leq 0.2, 0 \leq w \leq 0.1, 0 \leq x + y \leq 0.2,$ $M^1$ is at least one metal of Mn or Al, and $M^2$ is at least one metal selected from the group consisting of Ba, Ca, Zr, Ti, Mg, Ta, Nb and Mo), in particular, $Li_aNi_{1-x-y}Co_xMn_yO_2$ $(1.0 \leq a \leq 1.5, 0 \leq x \leq 0.2, 0 \leq y \leq 0.2, 0 \leq x+y \leq 0.2)$.

In the positive electrode active material particles included in the first positive electrode active material layer, the average particle size D50 of the primary macroparticles may be specifically 1 to 3 μm. Additionally, the average particle size D50 of the secondary particles formed by agglomeration of the primary macroparticles may be 2 to 5 μm.

When compared with the conventional primary microparticles as described below, the primary macroparticles has a large average particle size of primary particles.

From the perspective of cracking, a seemingly absent grain boundary and a large average particle size like the monolith are advantageous. In the case that only the average particle size D50 of the primary particles is increased by over-sintering, rock salt is formed on the surface of the primary particles and the initial resistance increases. Growing the crystallite size of the primary particles together reduces the resistance. Accordingly, the primary macroparticles according to an embodiment of the present disclosure are preferably particles having a large average particle size as well as a large average crystallite size, and of which grain boundaries are seemingly absent.

The simultaneous growth of the average particle size and the average crystallite size of the primary particles reduces the resistance compared to the monolith having a large resistance increase due to the rock salt formed on the surface by the sintering at high temperature, and it is advantageous in terms of long life.

Compared to the monolith, the microparticles comprising the "primary macroparticles" used in an aspect of the present disclosure, their agglomerates or a mixture thereof are advantageous in terms of low resistance due to the increased size of the primary particles per se and the reduced rock salt formation.

In this instance, the average crystallite size of the primary macroparticles may be quantitatively analyzed using X-ray diffraction analysis (XRD) by Cu Kα X-ray. Specifically, the average crystallite size of the primary macroparticles may be quantitatively analyzed by putting the prepared particles into a holder and analyzing diffraction grating for X-ray radiation onto the particles. The average crystallite size of the primary macroparticles may be 200 nm or more, specifically 250 nm or more, and more specifically 300 nm or more.

The first positive electrode active material layer comprising the positive electrode active material particles is less vulnerable to cracking than secondary macroparticles formed by agglomeration of primary microparticles, thereby preventing a short circuit under sufficiently high rolling pressure applied when manufacturing the electrode. Additionally, it is possible to reduce cracking in secondary macroparticles, thereby improving the life characteristics.

Second Positive Electrode Active Material Layer

The positive electrode active material particles included in the second positive electrode active material layer comprise positive electrode active material secondary microparticles having the average particle size D50 of 1 to 7 μm formed by agglomeration of primary macroparticles having the average particle size 50 of 0.5 to 3 μm or by agglomeration of primary microparticles having a smaller average particle size D50 than the primary macroparticles, and positive electrode active material secondary macroparticles having the average particle size D50 of 7 to 20 μm formed by agglomeration of primary microparticles having a smaller average particle size D50 than the primary macroparticles, wherein the average particle size D50 of the secondary macroparticles is larger than the average particle size D50 of the secondary microparticles.

In the constituents of the secondary microparticles, the secondary microparticles formed by agglomeration of the primary macroparticles having the average particle size D50 of 0.5 to 3 μm are the same as described in the first positive electrode active material layer. On the other hand, in the constituents of the secondary microparticles, the secondary microparticles formed by agglomeration of the primary microparticles are bimodal-type positive electrode active material secondary microparticles commonly used in the technical field. The average particle size D50 of the primary microparticles may be specifically 100 to 900 nm, and in particular, 100 to 400 nm. In particular, the secondary microparticles may include agglomerates of the primary microparticles alone. The secondary microparticles may be present in an amount of 10 to 100 parts by weight based on 100 parts by weight of the secondary macroparticles as described below.

On the other hand, the secondary macroparticles are positive electrode active material particles formed by agglomeration of the primary microparticles having a smaller average particle size D50 than the primary macroparticles. The primary microparticles are a nickel-based lithium transition metal oxide positive electrode active material, specifically, represented by $$Li_aNi_{1-x-y}Co_xM^1_yM^2_wO_2$$

$(1.0 \leq a \leq 1.5, 0 \leq x \leq 0.2, 0 \leq y \leq 0.2, 0 \leq w \leq 0.1, 0 \leq x+y \leq 0.2,$ $M^1$ is at least one metal of Mn or Al, and $M^2$ is at least one metal selected from the group consisting of Ba, Ca, Zr, Ti, Mg, Ta, Nb and Mo), in particular, $Li_aNi_{1-x-y}Co_xMn_yO_2$ $(1.0 \leq a \leq 1.5, 0 \leq x \leq 0.2, 0 \leq y \leq 0.2, 0 \leq x+y \leq 0.2)$.

The secondary macroparticles may have a larger average particle size D50 than the secondary microparticles, and specifically, the ratio of the average particle size D50 of the secondary macroparticles to the average particle size D50 of the secondary microparticles may be 5:1 to 2:1. The average particle size D50 of the secondary macroparticles is 7 to 20 µm, and more specifically 8 to 16 µm.

The macroparticles having the above-described size are particles commonly used as bimodal-type positive electrode active material macroparticles, and they are produced by the common manufacturing method as described below.

As described above, the macroparticles formed by agglomeration of the primary microparticles have a large specific surface area and a low particle strength. Accordingly, in the rolling process of the electrode using the positive electrode active material layer comprising a mixture of macroparticles and microparticles having a smaller average particle size than the macroparticles, the pressure by the roll press aggravates macroparticle cracking, which makes it difficult to sufficiently increase the pressure in the rolling process.

The inventors solve the problem by forming the first positive electrode active material layer and then forming the bimodal-type second positive electrode active material layer. Composition of First Positive Electrode Active Material Layer and Second Positive Electrode Active Material Layer In addition to the positive electrode active material particles having the above-described characteristics, the first and second positive electrode active material layers according to the present disclosure may further comprise positive electrode active material particles having a different average particle size or a different substance without hindering achieving the objectives of the present disclosure.

The first and second positive electrode active material layers may comprise a conductive material commonly used in the technical field.

The conductive material is used to impart conductivity to the positive electrode, and may include, without limitation, any type of conductive material capable of conducting the flow of electrons without causing any chemical change in the battery. Specific examples of the conductive material may include at least one of graphite, for example, natural graphite or artificial graphite; carbon-based materials, for example, carbon black, acetylene black, ketjen black, channel black, furnace black, lamp black, thermal black and carbon fibers; metal powder or metal fibers, for example, copper, nickel, aluminum and silver; conductive whiskers, for example, zinc oxide and potassium titanate; conductive metal oxide, for example, titanium oxide; or conductive polymers, for example, polyphenylene derivatives. In general, the conductive material in each of the first and second positive electrode active material layers may be included in an amount of 0.5 to 30 weight % based on the total weight of the first and second positive electrode active material layers.

In particular, the second positive electrode active material layer comprises single-walled carbon nanotubes as the conductive material. The single-walled carbon nanotubes have low resistance and thus reduce the electrode resistance and the cell resistance, thereby contributing to the improved resistance characteristics. The single-walled carbon nanotubes are highly untangled, and especially, they are effective in playing a crack bridging role between the secondary macroparticles. For example, the single-walled carbon nanotubes may be present in an amount of 0.1 weight % or more based on the total weight of the second positive electrode active material layer, and in this instance, the conductive material in the second positive electrode active material layer may be present in an amount of 0.5 to 3 weight % based on the total weight of the second positive electrode active material layer.

Additionally, the first and second positive electrode active material layers may comprise a binder.

The binder serves to improve the bonds between the positive electrode active material particles and the adhesion strength between the positive electrode active material and the positive electrode current collector. Specific examples of the binder may include, but is not limited to, at least one of polyvinylidene fluoride (PVDF), polyvinylidene fluoride-hexafluoropropylene copolymer (PVDF-co-HFP), polyvinylalcohol, polyacrylonitrile, carboxymethylcellulose (CMC), starch, hydroxypropyl cellulose, regenerated cellulose, polyvinylpyrrolidone, tetrafluoroethylene, polyethylene, polypropylene, ethylene-propylene-diene polymer (EPDM), sulfonated-EPDM, styrene butadiene rubber (SBR), fluoro rubber, or a variety of copolymers thereof. For example, the binder in each of the first and second positive electrode active material layers may be included in an amount of 1 to 30 weight % based on the total weight of the first and second positive electrode active material layers.
Method for Manufacturing a Positive Electrode First, a method for producing positive electrode active material particles will be described by way of illustration.

The following is the method for producing secondary particles formed by agglomeration of primary macroparticles according to an aspect of the present disclosure. However, the present disclosure is not limited thereto.

The method for manufacturing a nickel-based lithium transition metal oxide positive electrode active material, for example, a compound represented by $$Li_aNi_{1-x-y}Co_xM^1_yM^2_wO_2$$

$(1.0 \leq a \leq 1.5, 0 \leq x \leq 0.2, 0 \leq y \leq 0.2, 0 \leq w \leq 0.1, 0 \leq x+y \leq 0.2,$ $M^1$ is at least one metal of Mn or Al, and $M^2$ is at least one metal selected from the group consisting of Ba, Ca, Zr, Ti, Mg, Ta, Nb and Mo) will be described by way of illustration.

A transition metal containing solution comprising nickel, cobalt, manganese and $M^2$ at a predetermined mole ratio, an ammonia aqueous solution and a basic compound are mixed to form transition metal hydroxide precursor particles, followed by separation and drying, and then the transition metal hydroxide precursor particles are milled to a predetermined average particle size D50 (S1).

$M^2$ is optional, and the detailed description is made based on the absence of M2.

First, a positive electrode active material precursor comprising nickel (Ni), cobalt (Co) and manganese (Mn) is prepared.

In this instance, the precursor for preparing the positive electrode active material may be a positive electrode active material precursor available in the market, or may be prepared by a method for preparing a positive electrode active material precursor well known in the corresponding technical field.

For example, the precursor may be prepared by adding an ammonium cation containing chelating agent and a basic compound to a transition metal solution comprising a nickel containing raw material, a cobalt containing raw material and a manganese containing raw material, to cause coprecipitation reaction.

The nickel containing raw material may include, for example, nickel containing acetate, nitrate, sulfate, halide, sulfide, hydroxide, oxide or oxyhydroxide, and specifically, may include at least one of $Ni(OH)_2$, $NiO$, $NiOOH$, $NiCO_3 \cdot 2Ni(OH)_2 \cdot 4H_2O$, $NiC_2O_2 \cdot 2H_2O$, $Ni(NO_3)_2 \cdot 6H_2O$, $NiSO_4$, $NiSO_4 \cdot 6H_2O$, an aliphatic nickel salt or nickel halide, but is not limited thereto.

The cobalt containing raw material may include cobalt containing acetate, nitrate, sulfate, halide, sulfide, hydroxide, oxide or oxyhydroxide, and specifically, may include at least one of $Co(OH)_2$, $CoOOH$, $Co(OCOCH_3)_2 \cdot 4H_2O$, $Co(NO_3)_2 \cdot 6H_2O$, $CoSO_4$ or $Co(SO_4)_2 \cdot 7H_2O$, but is not limited thereto.

The manganese containing raw material may include, for example, at least one of manganese containing acetate, nitrate, sulfate, halide, sulfide, hydroxide, oxide or oxyhydroxide, and specifically, may include, for example, at least one of manganese oxide such as $Mn_2O_3$, $MnO_2$, $Mn_3O_4$; a manganese salt such as $MnCO_3$, $Mn(NO_3)_2$, $MnSO_4$, manganese acetate, a manganese salt of dicarboxylic acid, manganese citrate and an aliphatic manganese salt; manganese oxyhydroxide or manganese chloride, but is not limited thereto.

The transition metal solution may be prepared by adding the nickel containing raw material, the cobalt containing raw material and the manganese containing raw material to a solvent, to be specific, water or a mixed solvent of water and an organic solvent (for example, alcohol, etc.) that mixes with water to form a homogeneous mixture, or may be prepared by mixing an aqueous solution of the nickel containing raw material, an aqueous solution of the cobalt containing raw material and the manganese containing raw material.

The ammonium cation containing chelating agent may include, for example, at least one of $NH_4OH$, $(NH_4)_2SO_4$, $NH_4NO_3$, $NH_4Cl$, $CH_3COONH_4$ or $NH_4CO_3$, but is not limited thereto. The ammonium cation containing chelating agent may be used in the form of an aqueous solution, and in this instance, a solvent may include water or a mixture of water and an organic solvent (specifically, alcohol, etc.) that mixes with water to form a homogeneous mixture.

The basic solution may be an aqueous solution of a basic compound, for example, at least one of a hydroxide or a hydrate of alkali metal or alkaline earth metal such as $NaOH$, $KOH$ or $Ca(OH)_2$. In this instance, a solvent may include water, or a mixture of water and an organic solvent (specifically, alcohol, etc.) that mixes with water to form a homogeneous mixture.

The basic solution may be added to adjust the pH of the reactant solution, and may be added in such an amount that the pH of the metal solution is 9 to 12.

The transition metal containing solution comprising nickel, cobalt and manganese, the ammonia aqueous solution and the basic solution may be mixed and subjected to coprecipitation reaction to produce transition metal hydroxide precursor particles.

In this instance, the coprecipitation reaction may be performed at the temperature of 25° C. to 60° C. in an inert atmosphere of nitrogen or argon.

The resultant transition metal hydroxide precursor particles are separated and dried in a reactor and then milled to the predetermined average particle size D50 to form the secondary particles having the intended average particle size through the following process.

Subsequently, the milled transition metal hydroxide precursor particles are mixed with a lithium raw material and sintered in an oxygen atmosphere to produce secondary particles formed by agglomeration by primary macroparticles having the average particle size D50 of 0.5 to 3 μm (S2).

The secondary particles formed by agglomeration of the primary macroparticles having the predetermined average particle size may be produced by producing-milling-sintering the precursor particles according to the steps (S1) and (S2).

In the step (S2), the lithium raw material may include, without limitation, any type of material that dissolves in water, and may include, for example, lithium containing sulfate, nitrate, acetate, carbonate, oxalate, citrate, halide, hydroxide or oxyhydroxide. Specifically, the lithium raw material may include at least one of $Li_2CO_3$, $LiNO_3$, $LiNO_2$, $LiOH$, $LiOH \cdot H_2O$, $LiH$, $LiF$, $LiCl$, $LiBr$, $LiI$, $CH_3COOLi$, $Li_2O$, $Li_2SO_4$, $CH_3COOLi$, or $Li_3C_6H_5O_7$.

The high-Ni NCM based lithium composite transition metal oxide having the nickel (Ni) content of 80 mol % or more may be sintered at 790° C. to 950° C., and the sintering may be performed for 5 to 35 hours under an oxygen atmosphere. The oxygen atmosphere as used herein comprises ambient atmosphere and refers to an atmosphere comprising enough oxygen for sintering. In particular, the sintering is preferably performed in an atmosphere in which the partial pressure of oxygen is higher than the ambient atmosphere.

The secondary microparticles and the secondary macroparticles formed by agglomeration of the primary microparticles may include those available in the market, and may be directly produced using the known coprecipitation method. More specifically, they may be produced by obtaining, as the precursor, the secondary particles comprising the high-Ni composite transition metal hydroxide particles using the coprecipitation method commonly known in the technical field, mixing with the lithium source and sintering. Here, the method for controlling the precursor composition using the coprecipitation method and the type of the lithium source may follow the well-known technical knowledge.

The positive electrode active materials prepared as described above may be mixed with a conductive material and a binder to form a positive electrode material mixture for forming first and second positive electrode active material layers, and the positive electrode material mixture may be placed on a positive electrode current collector by the common method to form a positive electrode active material layer, and in turn, to manufacture a positive electrode.

Specifically, the positive electrode material mixture comprising the positive electrode active materials, the conductive material and the binder is added to a solvent to prepare a first positive electrode active material layer-forming composition, and the first positive electrode active material layer-forming composition is applied to a positive electrode current collector and then dried to form a first positive electrode active material layer. Subsequently, the positive electrode material mixture comprising the positive electrode active materials, the conductive material comprising the single-walled carbon nanotubes and the binder may be added to a solvent to prepare a second positive electrode active material layer-forming composition, and the second positive electrode active material layer-forming composition may be applied to the first positive electrode active material layer, followed by drying and rolling. The solvent may include solvents commonly used in the corresponding technical field, for example, at least one of dimethyl sulfoxide (DMSO), isopropyl alcohol, N-methylpyrrolidone (NMP), acetone or water. The solvent may be used in such an amount to have sufficient viscosity for good thickness uniformity when dissolving or dispersing the positive electrode active material, the conductive material and the binder and coating to manufacture the positive electrode in view of the slurry coating thickness and the production yield.

Alternatively, the positive electrode may be manufactured by casting the positive electrode active material layer-forming composition on a support, peeling off a film from the support and laminating the film on the positive electrode current collector.

Lithium Secondary Battery

According to another embodiment of the present disclosure, there is provided a lithium secondary battery comprising the positive electrode.

The lithium secondary battery comprises the positive electrode, a negative electrode opposite the positive electrode, a separator between the positive electrode and the negative electrode and an electrolyte, and the positive electrode is the same as described above. Additionally, optionally, the lithium secondary battery may further comprise a battery case accommodating an electrode assembly comprising the positive electrode, the negative electrode and the separator, and a sealing member to seal up the battery case.

In the lithium secondary battery, the negative electrode comprises a negative electrode current collector and a negative electrode active material layer on the negative electrode current collector.

The negative electrode current collector may include any type of material having high conductivity without causing any chemical change to the battery, for example, copper, stainless steel, aluminum, nickel, titanium, sintered carbon, copper or stainless steel treated with carbon, nickel, titanium or silver on the surface and an aluminum-cadmium alloy, but is not limited thereto. Additionally, the negative electrode current collector may be generally 3 to 500 μm in thickness, and in the same way as the positive electrode current collector, the negative electrode current collector may have microtexture on the surface to improve the bonding strength of the negative electrode active material. For example, the negative electrode current collector may come in various forms, for example, films, sheets, foils, nets, porous bodies, foams and non-woven fabrics.

In addition to the negative electrode active material, the negative electrode active material layer optionally comprises a binder and a conductive material. For example, the negative electrode active material layer may be formed by coating a negative electrode-forming composition comprising the negative electrode active material, and optionally the binder and the conductive material on the negative electrode current collector and drying, or by casting the negative electrode-forming composition on a support, peeling off a film from the support and laminating the film on the negative electrode current collector.

The negative electrode active material may include compounds capable of reversibly intercalating and deintercalating lithium. Specific examples of the negative electrode active material may include at least one of a carbonaceous material, for example, artificial graphite, natural graphite, graphitizing carbon fibers, amorphous carbon; a metallic compound that can form an alloy with lithium, for example, Si, Al, Sn, Pb, Zn, Bi, In, Mg, Ga, Cd, a Si alloy, a Sn alloy or an Al alloy; metal oxide capable of doping and undoping lithium such as $SiO\beta$ ($0<\beta<2$), $SnO_2$, vanadium oxide, lithium vanadium oxide; or a complex comprising the metallic compound and the carbonaceous material such as a Si—C complex or a Sn—C complex. Additionally, a metal lithium thin film may be used for the negative electrode active material. Additionally, the carbon material may include low crystalline carbon and high crystalline carbon. The low crystalline carbon typically includes soft carbon and hard carbon, and the high crystalline carbon typically includes high temperature sintered carbon, for example, amorphous, platy, flaky, spherical or fibrous natural graphite or artificial graphite, Kish graphite, pyrolytic carbon, mesophase pitch based carbon fibers, meso-carbon microbeads, mesophase pitches and petroleum or coal tar pitch derived cokes.

Additionally, the binder and the conductive material may be the same as those of the positive electrode described above.

On the other hand, in the lithium secondary battery, the separator separates the negative electrode from the positive electrode and provides a passage for movement of lithium ions, and may include, without limitation, any separator commonly used in lithium secondary batteries, and in particular, preferably, those having low resistance to the electrolyte ion movement and good electrolyte solution wettability. Specifically, the separator may include, for example, a porous polymer film made of a polyolefin-based polymer such as an ethylene homopolymer, a propylene homopolymer, an ethylene/butene copolymer, an ethylene/hexene copolymer and an ethylene/methacrylate copolymer or a stack of two or more porous polymer films. Additionally, the separator may include common porous non-woven fabrics, for example, non-woven fabrics made of high melting point glass fibers and polyethylene terephthalate fibers. Additionally, to ensure the heat resistance or mechanical strength, the coated separator comprising ceramics or polymer materials may be used, and may be selectively used with a single layer or multilayer structure.

Additionally, the electrolyte used in the present disclosure may include an organic liquid electrolyte, an inorganic liquid electrolyte, a solid polymer electrolyte, a gel polymer electrolyte, a solid inorganic electrolyte and a molten inorganic electrolyte, available in the manufacture of lithium secondary batteries, but is not limited thereto.

Specifically, the electrolyte may comprise an organic solvent and a lithium salt.

The organic solvent may include, without limitation, any type of organic solvent that acts as a medium for the movement of ions involved in the electrochemical reaction of the battery. Specifically, the organic solvent may include an ester-based solvent, for example, methyl acetate, ethyl acetate, $\gamma$-butyrolactone, $\varepsilon$-caprolactone; an ether-based solvent, for example, dibutyl ether or tetrahydrofuran; a ketone-based solvent, for example, cyclohexanone; an aromatic hydrocarbon-based solvent, for example, benzene, fluorobenzene; a carbonate-based solvent, for example, dimethylcarbonate (DMC), diethylcarbonate (DEC), methylethylcarbonate (MEC), ethylmethylcarbonate (EMC), ethylene carbonate (EC), propylene carbonate (PC); an alcohol-based solvent, for example, ethylalcohol, isopropyl alcohol; nitriles of R—CN (R is a C2 to C20 straight-chain, branched-chain or cyclic hydrocarbon, and may comprise an exocyclic double bond or ether bond); amides, for example, dimethylformamide; dioxolanes, for example, 1,3-dioxolane; or sulfolanes. Among them, the carbonate-based solvent is desirable, and more preferably, a cyclic carbonate (for example, ethylene carbonate or propylene carbonate) having high ionic conductivity and a high dielectric constant which contributes to the improved charge/discharge performance of the battery may be mixed with a linear carbonate-based compound (for example, ethylmethyl carbonate, dimethyl carbonate or diethyl carbonate) of low viscosity. In this case, the cyclic carbonate and the chain carbonate may be mixed at a volume ratio of about 1:1 to about 1:9 to improve the performance of the electrolyte solution.

The lithium salt may include, without limitation, any compound that can provide lithium ions used in lithium secondary batteries. Specifically, the lithium salt may include $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, LiN $(C_2F_5SO_2)_2$, $LiN(CF_3SO_2)_2$, LiCl, LiI or $LiB(C_2O_4)_2$. The concentration of the lithium salt may range from 0.1 to 2.0M. When the concentration of the lithium salt is included in the above-described range, the electrolyte has the optimal conductivity and viscosity, resulting in good performance of the electrolyte and effective movement of lithium ions.

In addition to the above-described constituent substances of the electrolyte, the electrolyte may further comprise, for example, at least one type of additive of a haloalkylene carbonate-based compound such as difluoro ethylene carbonate, pyridine, triethylphosphite, triethanolamine, cyclic ether, ethylene diamine, n-glyme, hexaphosphoric triamide, nitrobenzene derivatives, sulfur, a quinone imine dye, N-substituted oxazolidinone, N,N-substituted imidazolidine, ethylene glycol dialkyl ether, an ammonium salt, pyrrole, 2-methoxy ethanol or aluminum trichloride to improve the life characteristics of the battery, prevent the capacity fading of the battery and improve the discharge capacity of the battery. In this instance, the additive may be included in an amount of 0.1 to 5 weight % based on the total weight of the electrolyte.

The lithium secondary battery with the reduced degradation of the positive electrode material according to the present disclosure is useful in the field of mobile devices including mobile phones, laptop computers and digital cameras, and electric vehicles including hybrid electric vehicles (HEVs).

Accordingly, according to another embodiment of the present disclosure, there are provided a battery module comprising the lithium secondary battery as a unit cell and a battery pack comprising the same.

The battery module or the battery pack may be used as a power source of at least one medium- and large-scale device of power tools; electric vehicles including electric vehicles (EVs), hybrid electric vehicles, and plug-in hybrid electric vehicles (PHEVs); or energy storage systems.

Hereinafter, the embodiment of the present disclosure will be described in sufficiently detail for those having ordinary skill in the technical field pertaining to the present disclosure to easily practice the present disclosure. However, the present disclosure may be embodied in many different forms and is not limited to the disclosed embodiment.

Example 1

Production of First Positive Electrode Active Material Layer-Forming Positive Electrode Active Material Particles 4 liters of distilled water is put into a coprecipitation reactor (capacity 20 L), in which the temperature is maintained at 50° C., and 100 mL of 28 weight % ammonia aqueous solution is added to the reactor, and then a 3.2 mol/L transition metal solution in which $NiSO_4$, $CoSO_4$ and $MnSO_4$ are mixed at a mole ratio of nickel:cobaltmanganese of and a 28 weight % ammonia aqueous solution are continuously added to the reactor at 300 mL/hr and 42 mL/hr, respectively. Stirring is performed at the impeller speed of 400 rpm, and a 40 wt % sodium hydroxide solution is used to maintain the pH at 9. Precursor particles are formed by 10-hour coprecipitation reaction. The precursor particles are separated, washed and dried in an oven of 130° C. to prepare a precursor.

The $Ni_{0.8}Co_{0.1}Mn_{0.1}(OH)_2$ precursor synthesized by the coprecipitation reaction is put into a mixer to mill to a size of about 1 μm, and the milled precursor is mixed with LiOH at a mole ratio of 1.05 and thermally treated at 800° C. in an oxygen atmosphere for hours to produce $LiNi_{0.8}Co_{0.1}Mn_{0.1}O_2$ lithium composite transition metal oxide.

The obtained particles are particles having the average particle size D50 of 4 μm formed by agglomeration of primary macroparticles having the average crystallite size of 250 nm and the average particle size D50 of 2.5 μm.

Production of Second Positive Electrode Active Material Layer-Forming Positive Electrode Active Material Particles Production of Secondary Microparticles Secondary particles comprising high-Nickel composite transition metal hydroxide particles are obtained as a precursor using the known coprecipitation method and mixed with a lithium source, and then sintered to prepare $LiNi_{0.8}Co_{0.1}Mn_{0.1}O_2$ secondary microparticles having the average particle size D50 of 4 μm formed by agglomeration of primary microparticles having the average particle size D50 of 300 nm.

Production of Secondary Macroparticles

Secondary particles comprising high-Nickel composite transition metal hydroxide particles are obtained as a precursor using the known coprecipitation method and mixed with a lithium source, and then sintered to prepare $LiNi_{0.8}Co_{0.1}Mn_{0.1}O_2$ secondary macroparticles having the average particle size D50 of 15 μm formed by agglomeration of primary microparticles having the average particle size D50 of 500 nm.

Manufacture of Positive Electrode 96.5 parts by weight of the first positive electrode active material layer-forming positive electrode active material particles obtained by the above-described method, 2 parts by weight of ketjen black as a conductive material and 1.5 parts by weight of KF9700 as a binder are dispersed in a NMP solvent to prepare a first positive electrode active material layer-forming composition, and the first positive electrode active material layer-forming composition is applied to an aluminum foil current collector and dried to form a first positive electrode active material layer.

Subsequently, 97.5 parts by weight of the positive electrode active material comprising a mixture of the macroparticles and the microparticles obtained by the above-described method at a weight ratio of 8:2, 0.05 parts by weight of single-walled carbon nanotubes (OCSiAl, single-walled CNT) and 0.65 parts by weight of double-walled carbon nanotubes (LB-CNT) as a conductive material and 1.5 parts by weight of KF9700 (DA288) as a binder are dispersed in a NMP solvent to prepare a second positive electrode active material layer-forming composition, and the second positive electrode active material layer-forming composition is applied to the first positive electrode active material layer and dried to a second positive electrode active material layer which in turn is rolled to manufacture a positive electrode.

After the rolling, the thickness of the first positive electrode active material layer is 10.5 μm, and the thickness of the second positive electrode active material layer is 21 μm.

Example 2

A positive electrode is manufactured in the same way as example 1 except that parts by weight of single-walled carbon nanotubes and 0.69 parts by weight of double-walled carbon nanotubes are added as the conductive material when forming the second positive electrode active material layer.

Comparative Example 1

A positive electrode is manufactured in the same way as example 1 except that 0.7 parts by weight of double-walled carbon nanotubes alone are added as the conductive material when forming the second positive electrode active material layer.

Experimental Example 1: Average Particle Size

D50 may be defined as a particle size at 50% of particle size distribution, and is measured using a laser diffraction method.

Experimental Example 2: Average Crystallite Size of Primary Particle

The sample is measured using Bruker Endeavor (Cu Kα, λ=1.54 A°) equipped with LynxEye XE-T position sensitive detector with the step size of 0.02° in the scan range of 90° FDS 0.5°, 2-theta 15°, to make the total scan time of 20 min.

Rietveld refinement of the measured data is performed, considering the charge at each site (metals at transition metal site +3, Ni at Li site +2) and cation mixing. In crystallite size analysis, instrumental broadening is considered using Fundamental Parameter Approach (FPA) implemented in Bruker TOPAS program, and in fitting, all peaks in the measurement range are used. The peak shape fitting is only performed using Lorentzian contribution to First Principle (FP) among peak types available in TOPAS, and in this instance, strain is not considered.

The following is a method for manufacturing a lithium secondary battery using the positive electrode of examples 1 and 2 and comparative example 1 manufactured by the above-described method.

A mixture of artificial graphite and natural graphite at a mix ratio of 5:5 as a negative electrode active material, superC as a conductive material and SBR/CMC as a binder are mixed at a weight ratio of 96:1:3 to prepare a negative electrode slurry, and the negative electrode slurry is applied to a surface of a copper current collector, followed by drying and rolling, to manufacture a negative electrode.

An electrode assembly comprising the positive electrode and the negative electrode manufactured as described above and a porous polyethylene separator between the positive electrode and the negative electrode is made and placed in a case, and an electrolyte solution is injected into the case to manufacture a lithium secondary battery full cell.

In this instance, the electrolyte solution is prepared by dissolving 1.0M lithiumhexafluorophosphate (LiPF$_6$) in an organic solvent comprising ethylenecarbonate/ethylmethyl-carbonate/diethylcarbonate/(a mix volume ratio of EC/EMC/DEC=3/4/3).

Experimental Example 3. Measurement as to Whether a Short Circuit Occurs Under the Pressure of the Roll Press in the Electrode Rolling Process In the rolling process of the positive electrode of example and comparative example using the roll press, changes in porosity with pressure and whether a short circuit occurs or not are measured and the results are shown in the following Table 1.

TABLE 1

| Item | | Unit | Pressure of roll press (ton) | | | | |
|------|------|------|------|------|------|------|------|
| | | | 15 | 20 | 25 | 30 | 35 |
| Comparative example 1 | Porosity | % | 27 | 26 | 25 | shorted | — |
| Example 1 | | | 25 | 24 | 23 | 22 | 21 |
| Example 2 | | | 25 | 24 | 23 | 22 | 21 |

Experimental Example 4. Life Characteristics and Direct Current Internal Resistance (DCIR) Increase Measurement For the lithium secondary battery full cell manufactured according to example 1 and 2 and comparative example 1, the capacity retention and the resistance increase in 400 cycles is measured by the following method.

Figure 3:
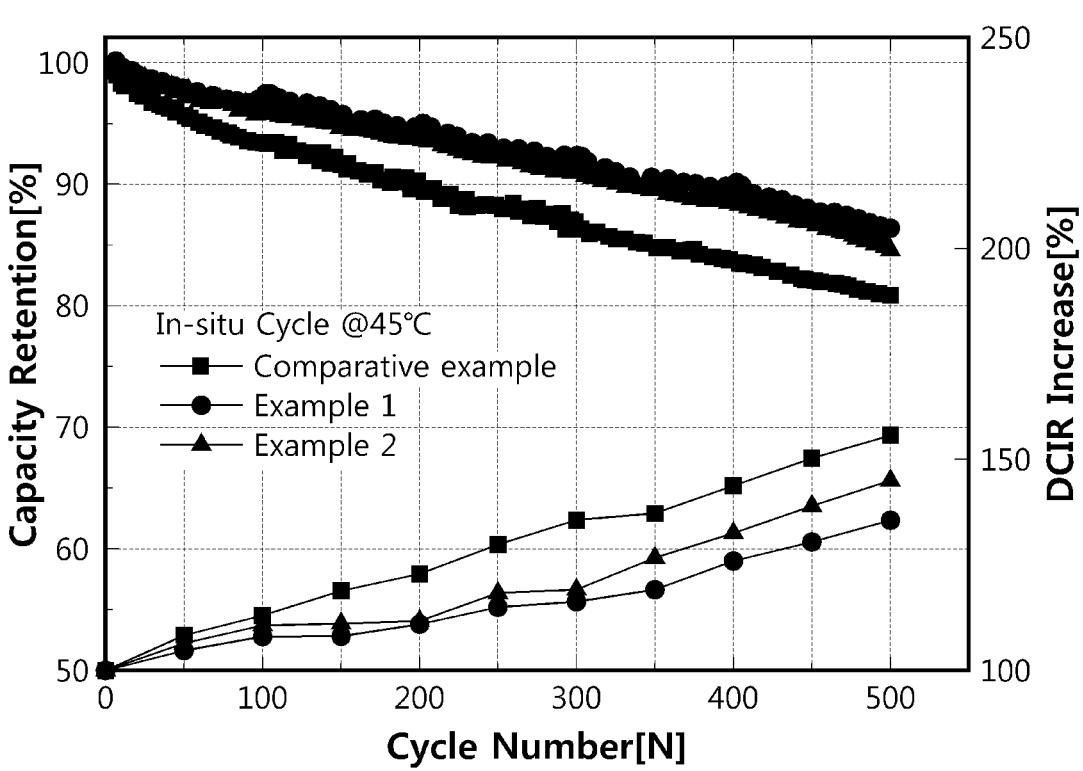
FIG. 3 is a graph showing the capacity retention and resistance of lithium secondary batteries according to example and comparative example.

The manufactured lithium secondary battery full cell is charged at 0.5C in CC-CV mode at 45° C. until 4.2V and discharged at a constant current of 1 C until 2.5V, and after this charge/discharge test is repeated in 900 cycles, the capacity retention and the resistance increase is measured and the results are shown in FIG. 3 and Table 2.

TABLE 2

| Cycle Reference Performance Test | Unit | Comparative example 1 | Example 1 | Example 2 |
|------|------|------|------|------|
| Capacity Retention @900$^{th}$ | % | 80.7 | 86.3 | 84.5 |
| DCIR Increase @900$^{th}$ | % | 154.9 | 134.7 | 144.3 |

Experimental Example 5. Multi Probe (MP) Resistivity Test

The positive electrode manufactured according to examples 1 and 2 and comparative example 1 is punched into a size of 5*5 and the sheet resistance is measured using multi probe resistivity measurement equipment. The results are shown in Table 3.

TABLE 3

|  | Comparative example 1 | Example 1 | Example 2 |
|---|---|---|---|
| MP resistivity (mOhm*cm²) | 45.1 (—) | 18.8 (▼58.3%) | 57.1 (▲26.6%) |
| 0.1sR@SOC50 (mOhm) | 366.4 (—) | 319.9 (▼12.7%) | 351.4 (▼4.1%) |
| 1 kHzR@SOC50 (mOhm) | 162.8 (—) | 137.6 (▼15.5%) | 151.3 (▼8.1%) |

What is claimed is:

1. A positive electrode for a lithium secondary battery, comprising:

a current collector;

a first positive electrode active material layer on a first surface of the current collector; and a second positive electrode active material layer on the first positive electrode active material layer, wherein the first positive electrode active material layer includes a first positive electrode active material particle and a conductive material, the first positive electrode active material particle including at least one of a primary macroparticle having an average particle size (D50) of 0.5 to 3 μm, a secondary particle having an average particle size (D50) of 3 to 7 μm formed by agglomeration of the primary macroparticle, or a mixture thereof, wherein the second positive electrode active material layer includes a second positive electrode active material particle and a conductive material, the second positive electrode active material particle including:

a secondary microparticle having an average particle size (D50) of 1 to 7 μm formed by agglomeration of the primary macroparticle having an average particle size (D50) of 0.5 to 3 μm or by agglomeration of a primary microparticle having a smaller average particle size (D50) than the primary macroparticle, and a secondary macroparticle having an average particle size (D50) of 7 to 20 μm formed by agglomeration of the primary microparticle having the smaller average particle size (D50) than the primary macroparticle, wherein an average particle size (D50) of the secondary macroparticle is larger than the average particle size (D50) of the secondary microparticle, wherein the first and second positive electrode active material particles are a nickel-based lithium transition metal oxide positive electrode active material, and wherein the conductive material included in the second positive electrode active material layer includes a first single-walled carbon nanotube.

2. The positive electrode according to claim 1, wherein the average particle size (D50) of the primary microparticles is 100 to 900 nm.

3. The positive electrode according to claim 1, wherein the average particle size (D50) of the primary microparticles is 100 to 400 nm.

4. The positive electrode according to claim 1, wherein an average crystallite size of the primary macroparticles included in the first positive electrode active material layer is equal to or larger than 200 nm.

5. The positive electrode according to claim 1, wherein the average particle size (D50) of the primary macroparticles included in the first and the second positive electrode active material layers is 1 to 3 μm.

6. The positive electrode according to claim 1, wherein the average particle size (D50) of the secondary microparticles is 2 to 5 μm, and the average particle size (D50) of the secondary macroparticles is 8 to 16 μm.

7. The positive electrode according to claim 1, wherein a ratio of the average particle size (D50) of the secondary macroparticles to the average particle size (D50) of the secondary microparticles is in a range of 5:1 to 2:1.

8. The positive electrode according to claim 1, wherein the secondary microparticles are present in an amount of 10 to 100 parts by weight based on 100 parts by weight of the secondary macroparticles.

9. The positive electrode according to claim 1, wherein a thickness (a) of the second positive electrode active material layer meets the following equation relative to a thickness (b) of the first positive electrode active material layer:

$$3b \le a. \qquad \text{(Equation)}$$

10. The positive electrode according to claim 1, wherein the secondary microparticles are agglomerates of the primary microparticles alone.

11. The positive electrode according to claim 1, wherein the nickel-based lithium transition metal oxide is represented by $$Li_aNi_{1-x-y}M^1{}_yM^2{}_wO_2,$$

wherein $1.0 \le a \le 1.5$, $0 \le x \le 0.2$, $0 \le y \le 0.2$, $0 \le w \le 0.1$, $0 \le x+y \le 0.2$, $M^1$ is at least one metal selected from the group consisting of Mn and Al, and $M^2$ is at least one metal selected from the group consisting of Ba, Ca, Zr, Ti, Mg, Ta, Nb and Mo.

12. The positive electrode according to claim 11, wherein the nickel-based lithium transition metal oxide is represented by $Li_aNi_{1-x-y}Co_xMn_yO_2$, wherein $1.0 \le a \le 1.5$, $0 \le x \le 0.2$, $0 \le y \le 0.2$, $0 \le x+y \le 0.2$.

13. The positive electrode according to claim 1, wherein the single-walled carbon nanotubes are present in an amount of 0.001 weight % or more based on a total weight of the second positive electrode active material layer.

14. The positive electrode according to claim 1, wherein the conductive material in the second positive electrode active material layer is present in an amount of 0.5 to 3 weight % based on a total weight of the second positive electrode active material layer.

15. A lithium secondary battery comprising the positive electrode according to claim 1.

* * * * *